United States Patent [19]
Fujii et al.

[11] 4,308,361
[45] Dec. 29, 1981

[54] PROPYLENE COPOLYMERS

[75] Inventors: Masaki Fujii; Mitsutaka Miyabayashi, both of Yokkaichi, Japan

[73] Assignee: Mitsubishi Petrochemical Company, Ltd., Tokyo, Japan

[21] Appl. No.: 152,605

[22] Filed: May 23, 1980

[30] Foreign Application Priority Data

Jun. 1, 1979 [JP] Japan .................................. 54-68532
Apr. 21, 1980 [JP] Japan .................................. 55-52658

[51] Int. Cl.³ .................... C08F 210/14; C08F 293/00
[52] U.S. Cl. .............................. 525/321; 260/33.6 PQ; 260/33.8 UA; 525/247; 526/82; 526/348.2; 526/348.3; 526/348.6
[58] Field of Search ..................... 525/321; 526/348.2, 526/348.3, 348.6

[56] References Cited

U.S. PATENT DOCUMENTS 3,732,335  5/1973  Hermans et al. .................... 525/321
3,888,949  6/1975  Shih ..................................... 525/321
3,954,697  5/1976  McConnell et al. .................. 526/90
4,210,570  7/1980  Trotter et al. ............. 260/33.6 AQ Primary Examiner—Stanford M. Levin
Attorney, Agent, or Firm—Robert E. Burns; Emmanuel J. Lobato; Bruce L. Adams

[57] ABSTRACT

A copolymer of propylene and a straight-chain α-olefin of 5 to 12 carbon atoms is characterized in that: its intrinsic viscosity is 0.3 to 15 dl./g. (at 135° C., in decalin); it contains 3 to 30 percent by weight of the α-olefin; and when it is subjected to successive extraction with o-dichlorobenzene at 40° C. and 80° C., the quantities, fusion peak temperatures, and content of the α-olefin of the resulting fractions are respectively within specific limits of values. A preferred copolymer contains about 0.5 to 50 percent of a propylene homopolymer block and about 99.5 to 50 percent of a random copolymer block of propylene and a straight chain α-olefin having 5 to 12 carbon atoms.

10 Claims, No Drawings

PROPYLENE COPOLYMERS

BACKGROUND OF THE INVENTION

This invention relates to propylene copolymers having excellent heat resistance and transparency and, at the same time, having softness.

In recent years there has been an amazingly rapid development of packaging materials and containers such as synthetic-resin films and bottles. There has been an urgent demand for improvement of the heat resistance with regard particularly to transparent and, moreover, soft materials among these articles. The utilization of materials of this character in the field of medical supplies such as transfusion liquid bags and blood bags and in the field of foodstuff packaging in forms such as squeeze bottles for mayonnaise, ketchup, and the like is being considered. For such utilization, in order for these materials to exhibit their inherent functional characteristics, they must have transparency and softness, needless to say. In addition, however, they must also possess heat resistance (i.e., the capability of retaining their shapes at high temperatures) sufficient to withstand sterilization processing such as that with hot water. Moreover, the production cost of such a material must, of course, be of an order which is reasonable with respect to its use.

As soft materials of this character, synthetic resins such as low-density polyethylenes, ethylenevinyl acetate copolymers, and soft polyvinyl chlorides have been used until now. However, the melting points of low-density polyethylenes and ethylene-vinyl acetate copolymers are a little over 110° C. to approximately 90° C., whereby these resins, as they are, cannot sufficiently withstand sterilization processing with hot water. Furthermore, low-density polyethylenes, which have relatively high melting points, cannot be said to have very high transparencies. While soft polyvinyl chlorides possess heat resistance for withstanding sterilization processing with hot water, they contain residual monomer and substances such as a plasticizer, which are toxic and therefore give rise to problems in the use of these resins in the fields of medical supplies and foodstuff packaging.

On one hand, among the copolymers of propylene, a random copolymer of propylene with ethylene or of propylene with butene-1 has heat resistance for withstanding hot-water sterilization, but the degree of softness is still inadequate for the uses which are considered to be problematical at present. The reason for this is that, although the copolymer tends to become a soft polymer as the content of the ethylene or butene-1 is increased, it then tends to become a rigid or hard polymer as the proportion of these comonomer units in the form of blocks is increased. Further, some of these copolymers have higher transparencies than propylene homopolymer but have the tendency to begin to have lower transparencies in a region of high comonomer content similarly as in the above described transformation into a rigid polymer. As a result, these copolymers become unsuitable for applications to the aforementioned various uses.

A copolymer of propylene with a branched α-olefin such as 4-methylpentene-1 also has good heat resistance similarly as in the case of a copolymer of propylene with ethylene or butene 1. However, in order to obtain the desired degree of softness, this expensive comonomer must be introduced in a high concentration. Furthermore, in the case where the copolymer is softened by an introduction of the comonomer in such a high concentration, also, the transparency is very poor, which is a serious problem.

It is known that a copolymer of propylene with a straight-chain α-olefin of 5 to 12 carbon atoms such as hexene-1 provides a material of excellent softness and transparency even with a comonomer content of relatively small proportion. In this connection, for this copolymer, to be considered as a soft material, it is desirable that the value of its Olsen bending stiffness be 6,000 kg/cm$^2$ or less, preferably 5,000 kg/cm$^2$ or less. There may be no lower limit for the bending stiffness as long as the copolymer is to be regarded as a soft material, but the copolymer having the bending stiffness of 1,000 kg/cm$^2$ or less, especially of 500 kg/cm$^2$ or less, may be disadvantageous from the practical point of view since the copolymer tends to be tacky or less heat-resistant.

If a copolymer having a high heat resistance which could not be attained by the already existing copolymers and fully retaining the excellent softness and transparency possessed by a copolymer of propylene with a straight-chain α-olefin having 5 to 12 carbon atoms of this character could be produced, it would be of great advantage and utility.

SUMMARY OF THE INVENTION

It is an object of this invention to solve the aforedescribed problems and to provide a superior copolymer of the character described in the preceding paragraph. This invention contemplates achieving the above object by providing a propylene copolymer composed of fractions of specific proportions and having limited specific physical properties and composition.

According to this invention, briefly summarized, there is provided a copolymer of propylene and a straight-chain α-olefin having 5 to 12 carbon atoms, characterized in that:

(1) the limiting viscosity thereof is 0.3 to 15 dl/gram (at 135° C., in decalin);

(2) the content of the straight-chain α-olefin having 5 to 12 carbon atoms therein is 3 to 30 percent by weight; and (3) the quantity, the fusion peak temperature as determined by differential scanning calorimetry (DSC), and the content of the straight-chain α-olefin of each of the fractions resulting from successive extraction of the copolymer at 40° C. and 80° C. by means of o-dichlorobenzene are as indicated in the table.

| Fraction | Definitive quantities: | | |
| --- | --- | --- | --- |
| | Quantity (% by weight) | Fusion peak temp. by DSC (°C.) | Content of straight-chain α-olefin (% by weight) |
| Fraction soluble at or below 40° C. | 1 to 45 | Substantially no peaks recognizable | 10 to 60 |
| Fraction soluble at or above 40° C. and at or below 80° C. | 10 to 74 | 80 to 135 | 3 to 17 |
| Fraction insoluble at or below 80° C. | 25 to 75 | 135 to 160 | 1 to 11 |

According to the findings, a copolymer retaining excellent softness and transparency and, moreover, having a high heat resistance can be obtained at present only in the case where it is limited in this manner.

When the fact that these various characteristics have mutually conflicting or antagonistic relationships is considered, it may be said that the fact that these various characteristics are simultaneously possessed by the copolymer of this invention is an unexpected result.

DETAILED DESCRIPTION OF THE INVENTION

1. Copolymer

A copolymer according to this invention is defined by the requirements or conditions (1), (2), and (3) set forth hereinabove. A copolymer defined by these conditions may be a block copolymer or it may be a non-block copolymer.

1-1. Molecular weight

It is necessary that the molecular weight of the copolymer fall within a range corresponding to a limiting viscosity of 0.3 to 15 dl/g in decalin at 135° C. When the molecular weight is less than this range, the mechanical characteristics of the copolymer will not reach practical levels, or the forming of articles from the copolymer will be impossible. On the other hand, if the molecular weight is higher than this range, the viscoelastic characteristic of the copolymer in the molten state is poor, and in this case, also, forming is impossible.

1-2. Composition

Throughout this disclosure, quantities of substances expressed in percent (%) are by weight unless otherwise specified.

The instant copolymer consists essentially of propylene (hereinafter referred to as monomer $M_1$) and a straight-chain α-olefin (hereinafter referred to as monomer $M_2$) and contains 3 to 30 percent, preferably 5 to 20 percent, and still more preferably 7 to 15 percent of the monomer $M_2$.

In the case where the $M_2$ content is within this range, softness, transparency, and heat resistance can all be exhibited in a high degree. When the $M_2$ content is below this range, the softness and transparency will be impaired. On the other hand, if the $M_2$ content is higher than this range, the heat resistance will not be maintained at a high level.

1-3. Successive extraction

For the instant copolymer to exhibit its expected characteristics in a high degree, it is necessary that the aforedescribed conditions for the whole polymer, that is, for the entire polymer, be satisfied, and that, in addition, the fractions obtained from successive extraction at 40° C. and 80° C. by using o-dichlorobenzene satisfy the following conditions (A), (B), and (C).

1-3-1. Quantities of fractions (A) The quantity of the fraction soluble at 40° C. or lower temperature (hereinafter referred to as fraction (A) is 1 to 45 percent, preferably 3 to 40 percent, more preferably 5 to 35 percent.

(B) The quantity of the fraction soluble at a temperature exceeding 40° C. but being 80° C. or lower (hereinafter referred to as fraction B) is 10 to 74 percent, preferably 15 to 67 percent, more preferably 20 to 60 percent.

(C) The quantity of the fraction insoluble at 80° C. or lower (hereinafter referred to as fraction (C) is 25 to 75 percent, preferably 30 to 70 percent, more preferably 35 to 65 percent, most preferably 40 to 55 percent.

The fraction A is an essential element governing principally the softness and transparency of the instant copolymer and, if its quantity is below the above specified range, it cannot fully exhibit these characteristics. If the quantity of the fraction A is above the above specified range, it will give rise to an impairment of its heat resistance.

The fraction C is an essential element governing principally the heat resistance of the instant copolymer. If its quantity is less than the above specified range, the heat resistance of the copolymer will be impaired. If its quantity exceeds the specified range, the softness and transparency of the copolymer will be adversely affected.

The quantity of the fraction B is automatically determined once the quantities of the fractions A and C are determined. This fraction has characteristics intermediate between those of the fractions A and C and has the function of causing these two fractions to intimately dissolve each other.

1-3-2. Fusion characteristic by DSC

In the case where a fusion thermograph is determined by DSC in conformance with the conditions set forth hereinafter, it is necessary that a fusion peak be not observable for the fraction A, that is to say, that this fraction A be substantially noncrystalline. In a rare case, a very minute peak is observed, but an occurrence of this order should be interpreted as one wherein a peak is substantially not recognizable.

The fraction C should have a distinct fusion peak in the temperature range of 135° to 160° C., preferably 137° to 158° C., more preferably 140° to 155° C. Below this range, heat resistance will not be exhibited in a high degree. Above this range, that, in itself, does not give rise particularly to an undesirable result, but, ordinarily in such a case, the quantity of the fraction A decreases excessively with the result that the softness and the transparency of the copolymer become poor.

Ordinarily, the fusion characteristic of the fraction B is secondarily determined as the fusion characteristics of the other fractions are placed within specific ranges, but, conversely, for the fusion characteristics of the fractions A and C to satisfy the above enumerated conditions, it is necessary that the fusion peak temperature be within the range of 80° to 135° C., preferably 85° to 130° C., more preferably 90° to 125° C.

As is apparent from the above description, the fraction A is a non-crystalline portion, the fraction B is a low-crystalline portion and the fraction C is a high-crystalline portion. Among these, the fractions A and B contribute to providing the copolymer with softness and the fraction C contributes to providing the copolymer with heat resistance. The copolymer of propylene with a $C_5$–$C_{12}$ straight-chain α-olefin is substantially of multi-dispersibility, and when the copolymer has such multi-dispersibility that the quantities and the fusion properties of the fractions obtained from the successive extraction by o-dichlorobenzene are within the prescribed range in accordance with the present invention, the softness and the heat resistance are established in the present copolymer in good balance. In this regard, it is believed that copolymers which have heretofore been known are either soft materials which are poor in heat resistance and which are made excessively of low- or non-crystalline fraction or rigid or hard materials which are made excessively of a high-crystalline fraction, and that the copolymer as is in accordance with the present invention which has both heat resistance and the softness in good balance has not heretofore been known in the art.

1-3-3. Composition

It is necessary that the $M_2$ content in each of the extracted fractions of the copolymer be as follows.

The $M_2$ content in the fraction A is 10 to 60 percent, preferably 12 to 50 percent, more preferably 14 to 40 percent. In the case where this $M_2$ content departs from this range, the quantity of the fraction A deviates from the range set forth in the above paragraph 1-3-1, whereby the undesirable result described in the same paragraph is incurred.

The $M_2$ content in the fraction B is 3 to 17 percent, preferably 5 to 15 percent, more preferably 7 to 13 percent.

The $M_2$ content in the fraction C is 1 to 11 percent, preferably 1.5 to 9 percent, more preferably 2 to 7 percent.

The ranges of these $M_2$ contents in the fractions B and C are also established for the same reasons as those for the fraction A.

1-4. Monomer $M_2$

The monomer $M_2$ is a straight-chain α-olefin having 5 to 12 carbon atoms. Accordingly, it can be selected from pentene-1, hexene-1, heptene-1, octene-1, nonene-1, decene-1, undecene-1, and dodecene-1. Of these, pentene-1, hexene-1, and octene-1 are preferable because of their copolymerization reactivity with propylene. Hexene-1 is particularly preferable. These monomers may be used singly or as mixtures thereof.

Depending on the necessity, it is also possible to cause a copolymerizable monomer other than the propylene ($M_1$) and the monomer $M_2$, such as ethylene, butene, any of various branched α-olefins, dienes, polar vinyl monomer, and others to undergo copolymerization with the monomers $M_1$ and $M_2$ within limits wherein the results will be counter to the objects and purport of the invention, for example, in a quantity of the order of up to 30, preferably up to 20, percent by weight of the quantity of ($M_1+M_2$). The expression "consisting essentially of the monomer $M_1$ and the monomer $M_2$" in defining the present copolymer is to be construed this way.

2. Product of the copolymer

The copolymer of this invention is ordinarily produced in the presence of a stereospecific polymerization catalyst. A preferred catalyst is one which contains at least a titanium component and an organoaluminum compound.

For the titanium component of the catalyst, various titanium trichlorides of the α, β, γ, and δ forms and compositions formed by causing these titanium trichlorides to be carried on carriers in which magnesium chloride is a predominant constituent are representative. Among these, a titanium trichloride composition as disclosed in Japanese Patent Laid Open Publication No. 34478/1972 and others is preferable in view that the copolymer thereby produced exhibits highly desirable characteristics, which titanium trichloride composition is produced by subjecting a eutectic complex of a titanium trichloride and aluminum chloride which has been formed by reducing titanium tetrachloride with an organoaluminum compound to extraction with a complexing agent such as, for example, isoamyl ether thereby to extract and remove the aluminum chloride in the complex.

In addition to these, all compounds known to have olefin polymerizability, such as various halides, alkylhalides, alkoxides, and alkoxyhalides of tetravalent to divalent titanium can be used.

The organoaluminum compound to be used in combination with the above described titanium component is typically represented by the formula $AlR_mX_{3-m}$, wherein R is hydrogen or a hydrocarbon residue having a number of carbon atoms of the order of 1 to 12; X is a halogen atom or an alkoxy group having a number of carbon atoms of the order of 1 to 12; and $1 \leq m \leq 3$. Specific examples include triethylaluminum, tri-i-butylaluminum, tri-n-octylaluminum, diethylaluminum hydride, diethylaluminum chloride, ethylaluminum sesquichloride, ethylaluminum dichloride, and diethylaluminum iodide.

By adding various electron donative compounds to the above described titanium component and/or the organoaluminum compound, it is possible to improve such properties as activity, stereospecificity, and the particle properties of the copolymer thereby produced.

The copolymerization reaction can be carried out by a batch-wise or a continuous operation. Furthermore, the polymerization process can be selected from suspension polymerization and solution polymerization in an inactive solvent, solventless polymerization in liquid-phase propylene, and gaseous-phase polymerization in gaseous-phase propylene.

In addition, it is possible to utilize any technique applicable in relation to homopolymerization and copolymerization of propylene or an α-olefin as long as that technique is not counter or detrimental to the objects and purport of this invention.

By way of example, batch-wise suspension polymerization in an inactive solvent is explained in some more detail below.

Into an autoclave equipped with an agitator the inside of which has been replaced amply with propylene are introduced inactive liquid hydrocarbon such as heptane as a polymerization medium. A stereospecific catalyst and propylene are then introduced, and homopolymerization of propylene is first caused to take place. The homopolymerization of propylene is not requisite, but it is preferable to carry out the homopolymerization so that the quantity of the homopolypropylene in the final copolymer comprises approximately 0.5 to 50% because such advantages in the copolymer obtained are obtainable that the apparent gravity of the copolymer particles is high and the quantity of amorphous copolymer soluble in a hydrocarbon solvent produced as a by-product is small, and heat resistance of the copolymer is improved in good balance with softness and transparency. These advantages are obtainable especially when the homopolymerization is carried out at a temperature which is lower at least by ca. 10° C. than the temperature at which the succeeding copolymerization is carried out and which is, for example, ca. 0°–50° C.

A straight-chain α-olefin of 5–17 carbon atoms ($M_2$) is then introduced to carry out random copolymerization of propylene with the α-olefin, which α-olefin ($M_2$) may be introduced in one time or continuously over a certain period of time at a selected rate. According to the discovery of the present inventors, copolymerization of propylene with the α-olefin ($M_2$) wherein the ratio of propylene ($M_1$) to $M_2$ is maintained as close at a constant level as possible throughout the copolymerization will produce a copolymer which has better physical properties than a copolymer produced when the ratio $M_1$ to $M_2$ has been varied during the copolymerization. Accordingly, it is preferable to carry out the copolymerization so that when propylene is to be added at a constant pressure, a certain quantity of the α-olefin ($M_2$) is added in one time and the remainder of the α-olefin ($M_2$) is added continually to supplement the quantity consumed, or when propylene is to be added at a constant rate the α-olefin ($M_2$) is added also at a constant rate. Even in the latter practice, the concentration of the $M_2$ in comparison with the concentration of the $M_1$ is liable to be higher in the latter course of copolymerization than in the former course of copolymerization and it is thus preferable to stop feeding of the $M_2$ thereby to maintain the ratio $M_1$ to $M_2$ as close at a constant level as possible.

Hydrogen may, if desired, be used as a regulator of molecular weight during the homopolymerization or the copolymerization.

The temperature for the copolymerization is usually 30° to 100° C., preferably 40° to 80° C., more preferably 50° to 70° C. The polymerization pressure (gauge) is normal to 100 kg/cm$^2$, preferably normal to 20 kg/cm$^2$, more preferably normal to 10 kg/cm$^2$.

In the batch-wise copolymerization, it is desirable to suppress the formation of "uncontrolled" or undesired copolymers at the end of the copolymerization thereby to produce copolymer of as narrow range of copolymer composition as possible. The undesired polymerization can take place between the end of the polymerization and deactivation of the catalyst by contacting it with water, an alcohol or an ether or, when no such catalyst deactivation is conducted, separation of the polymer produced from the unpolymerized monomer. It is thus desirable to temporarily deactivate the catalyst before the catalyst is finally deactivated.

Carbon monoxide or dioxide is useful as the temporary deactivator of catalyst. Introduction of a quantity of carbon monoxide or dioxide into a polymerization system containing the catalyst effectively deactivate the catalyst only for a certain period of time, and when the carbon mono- or dioxide is removed from the polymerization system the catalyst activity then revives or when the quantity of the carbon mono- or dioxide is small the catalyst activity revives in relatively a short time.

The quantity of carbon monoxide or dioxide should be at least chemically an equivalent to the quantity of the catalyst principal constituent which, when the catalyst comprises a titanium component, is titanium. The highest quantity is restricted only by the pressure resistance of the polymerization vessel. The preferable quantity in view of duration of the temporary deactivation and economics may be 10–10,000 equivalents, preferably 100–1,000 equivalents. Both of carbon monoxide and dioxide are effective. Carbon monoxide appears to be more effective than carbon dioxide, but carbon dioxide is preferable in view of toxicity and inflammability. Such a temporary deactivator as carbon monoxide or dioxide is advantageous over such a "permanent" deactivator as water or an alcohol in view that the former can easily be removed from the polymerization system without contaminating the system for the succeeding polymerization.

The copolymer in accordance with the present invention may be used as such or, if desired, in admixture with various additives which are known as additives for polymers such as a stabilizer against heat, a lubricant, an antioxidant, an antistatic agent, a colorant, a flame retardant, a plasticizer and a filler such as talc, calcium carbonate, mica or glass fiber.

3. Block copolymer

As mentioned hereinbefore, a copolymer of this invention can be a block copolymer.

One specific example of a block copolymer of this character is characterized in that it is defined by the following conditions (1) and (2).

(1) The block polymer consists essentially of substantially a) 0.5 to 50 percent of a propylene homopolymer block and b) 99.5 to 50 percent of a random copolymer block of propylene (monomer $M_1$) and a straight-chain α-olefin having 5 to 12 carbon atoms (monomer $M_2$).

(2) The intrinsic viscosity of the block copolymer is 0.3 to 15 dl/g (in decalin, at 135° C.).

Preferably, this propylene block copolymer is further defined by the following conditions (3) and (4).

(3) One or more fusion peaks of the block copolymer based on analysis by means of a differential scanning calorimeter (DSC) all exist at or above 130° C., or the fusion heat quantity of the portion fusing at or above 130° C. is 40 percent or more than the total fusion heat quantity.

(4) The Olsen bending stiffness of 10-degree angle (as measured in conformance with ASTM D-747-70, Test for Stiffness of Plastics by Means of a Cantilever Beam) is 6,000 kg/cm$^2$ or lower.

This propylene block copolymer is produced, in the first stage of polymerization, by homopolymerizing propylene in the presence of a stereospecific polymerization catalyst until its quantity becomes a value corresponding to 0.5 to 50 percent of the total polymerization quantity and, in the second stage, copolymerizing propylene and a straight-chain α-olefin ($M_2$) in a state wherein both are simultaneously present until their quantity becomes a value corresponding to 50 to 99.5 percent of the total polymerization quantity.

3-1. Composition and molecular weight

The block polymer according to this specific example consists essentially of (a) 0.5 to 50 percent, preferably 1 to 30 percent, of the homopolymer block of propylene and (b) 99.5 to 50 percent, preferably 99 to 70 percent, of a random copolymer block of propylene and a straight-chain α-olefin ($M_2$) having 5 to 12 carbon atoms (as described in detail hereinbefore). When the proportion of the propylene homopolymer block is within this range, only, the least heat resistance of the copolymer can be elevated with almost no impairment of its softness and transparency. However, when this proportion is below this range, there is no recognizable effect. When the proportion is above this range, although the effect of improvement of the heat resistance is still exhibited to some extent, the stiffness begins to increase rapidly, and the transparency becomes poor.

The content of the monomer $M_2$ unit in the random copolymer block is selected with the range of 3 to 30 percent, preferably 5 to 25 percent, most preferably 8 to 20 percent. In this range, good heat resistance, stiffness, and transparency are attained in well-balanced state. With a content of the monomer $M_2$ unit lower than this range, the resulting softness and transparency cannot be said to be adequate. On the other hand, when the content is above this range, not only does the heat resistance decrease, but the surface of the copolymer begins to become tacky when it is formed into a shaped article.

The phrase ". . . consisting essentially of propylene and the monomer $M_2$" means that, a copolymerizable monomer other than these two monomers may be contained in a small quantity, for example, up to 10 percent on the basis of the total weight of these two monomers.

It is necessary that the molecular weight of the block copolymer according to this specific example fall within a range corresponding to an intrinsic viscosity of 0.5 to 15 dl/g in decalin, at 135° C. When the molecular weight is below this range, the mechanical characteristics of the resulting copolymer do not reach practical levels, and the forming, itself, of articles becomes impossible. When the molecular weight is higher than this range, the visco-elastic characteristics of the copolymer in the molten state become poor, and in this case, also forming becomes impossible.

For this block copolymer to be considered to be a soft material, it is desirable that the value of the Olsen bending stiffness be less than 6,000 kg/cm$^2$, preferably less than 5,000 kg/cm$^2$.

3-2. Fusion characteristic

For the block copolymer according to this specific example to fully exhibit its heat resistance, it is desirable that the following requirement be satisfied relative to the fusion curve based on measurement by means of a DSC. One or more fusion peaks in the fusion curve are all at or above 130° C., preferably at or above 135° C., or the fusion heat quantity of the portion fusing at a temperature at or above 130° C. is 40 percent or more, preferably 45 percent or more of the total fusion heat quantity.

3-3. Production

With consideration of the combining of the propylene homopolymerization process and the succeeding random copolymerization of propylene and the monomer $M_2$ (wherein both the monomers are simultaneously present), the block copolymer is produced by carrying an ordinary stereospecific polymerization as shown hereinabove.

4. Examples of experiments

In the following examples of experiments and comparison examples, unless specified otherwise: the Olsen bending stiffness (10-degree angle) is based on ASTM D 747-70, "Test for Stiffness of Plastics by Means of a Cantilever Beam"; haze was measured in conformance with Japanese Industrial Standards (JIS) K 6714-58 "Methacrylic resin plates for aircraft"; and measurement of deformation under heat and pressure, DSC analysis, and successive extraction were carried on the basis of the methods described below.

Measurement of deformation under heat and pressure

A copolymer whose heat resistance is to be evaluated is formed into a sheet of 2-mm thickness by a method such as pressing or injection molding. Test pieces each measuring 10×10×2 mm are cut from this sheet. These test pieces are placed between pressure plates in a silicon oil bath maintained at a measurement temperature of 130° C., and by placing a load of a specific weight (1 kg) thereon, pressure is applied to the test pieces. The variations with elapse of time of the thickness of the test pieces are determined by means of a dial gage. The deformation rate D (percent) under heat and pressure is calculated for each test piece by the following equation.

$$D = \frac{\text{variation of thickness of test piece (mm)}}{\text{original thickness of test piece (2 mm)}} \times 100$$

DSC analysis

By using a Perkin-Elmer type model DSC-2, each copolymer sample, weighing 5 mg, is heated and fused for 3 minutes at 190° C. in a nitrogen gas stream and is thereafter cooled at a cooling rate of 10° C./min. to 60° C. thereby to crystallize the sample. Then, as the sample is again fused at a temperature rise rate of 10° C./min., a thermogram is obtained, and from this temperatures corresponding to peaks are read.

Successive extraction

For this successive extraction, an extraction apparatus comprising, essentially, a hollow glass cylinder of 88-mm inner diameter and height of 700 mm, clean glass beads of 80- to 100-mesh size of an apparent volume corresponding to 2,000 ml placed in the glass cylinder, and an outer hollow cylinder for flow therein of silicon oil for temperature adjustment, and having, at its upper part, a probe tube with a temperature-directing end, a polymer solution feed nozzle, and an extraction solvent feed nozzle and, at its lower part, a drain nozzle is used.

o-Dichlorobenzene (hereinafter referred to as ODCB) in a quantity to bring its level just even with the upper level of the layer of the glass beads is introduced beforehand into the glass cylinder, and the temperature therein is maintained at 140°±0.5° C. Separately, approximately 3.0 g of precisely weighed copolymer and 1 g of 2,6-di-t-butyl-p-cresol (as an antioxidant) are dissolved beforehand in 500 g of ODCB at 140° C., and this solution is gently added onto the previously added ODCB layer.

The drain nozzle is opened to drain out the previously added ODCB at a rate of 500 ml/hour, and, at the same time, to cause the glass bead layer to be immersed in the copolymer solution added later. Then the entire apparatus is left to cool naturally to room temperature, whereupon the polymer is deposited on the surfaces of the glass beads.

By adjusting the temperature of the silicon oil flowing within the outer cylinder, the temperature within the glass cylinder, constituting an extraction column, is set at 39.5° to 40.0° C. The drain nozzle is opened to drain out the polymer solution at a rate of 1 liter/hour. At the same time, through the top of the tower, ODCB containing 0.2 percent of 2,6-di-t-butyl-p-cresol and adjusted to a temperature of 39.5° to 40.0° C. is added at the same rate of draining of the polymer solution. By this procedure, the fraction of the polymer soluble in the ODCB at 40° C. is extracted. The end point of this extraction is verified as that point at which the index of refraction of the extracted liquor becomes equal to that of the solvent after a volume of the extracted liquor equal to three or more times the holding volume of the column has been drained.

The temperature within the column is then set at 79.5° to 80.0° C., and, by the same procedure as that carried out at 40° C., the polymer fraction soluble in ODCB at 80° C. is extracted.

With respect to fraction which is insoluble in ODCB at 80° C., the above described procedure is carried out with a column interior temperature of 140° C., and the total quantity is extracted.

Of the extracted liquors respectively obtained at different temperatures, only the fraction of 40° C. is concentrated to dryness. Each of the other fractions is preparatorily concentrated at 70° to 80° C. under reduced pressure in a rotary evaporator, and an excess quantity of acetone is added to the concentrated solution thus obtained thereby to precipitate the polymer. The precipitated polymer is separated through a No. G-3 glass filter, and is washed with an excess quantity of acetone to remove the antioxidant remaining in the polymer. Finally, the polymer is dried in a vacuum at 80° C. for 8 hours, and then the specified analysis is carried out.

EXAMPLE A1

The interior of an autoclave equipped with an agitation means of 150-liter capacity was amply purged with propylene and thereafter was supplied with 40 liters (lit.) of n.heptane, 5.5 grams (g) of titanium trichloride (TGL catalyst manufactured by Marubeni Solvay Kagaku, Japan), and 27.5 g of diethylaluminum chloride (DEAC). Propylene was introduced into the reaction vessel at a temperature of 40° C. and a pressure of 2.0 kg/cm$^2$, gauge, during 15 minutes, and homopolymerization was thus carried out.

The vessel interior temperature was then raised to 60° C., and propylene and hexene-1 were fed into the vessel at rates of 5.0 kg/hr and 6.8 kg/hr, respectively, during a period of 2 hours 45 minutes. At this point, the supply of the hexene-1 was stopped, and only the propylene was further supplied for 45 minutes at the rate of 5.0 kg/hr.

Up to this point in the above described procedure, hydrogen was also fed into the reaction system so as to maintain a hydrogen concentration of the gaseous phase part in the reaction vessel interior at 1.4 percent by volume.

Thereafter, the polymerization is continued for a further 2 hours with only the still unreacted monomers existing in the reaction vessel without any supplying whatsoever of propylene, hexene-1, and hydrogen.

The polymer slurry thus obtained was discharged into catalyst composition tank in which n-heptane containing n-butanol (as a catalyst decomposing agent) and potassium hydroxide (as a neutralizing agent) had been placed, and decomposition and neutralization of the catalyst was carried out. By centrifuging, a polymer was separated out as a cake containing the solvent. This cake, together with pure water containing an anionic emulsifier, was treated at 100° C., and the solvent was removed by steam stripping. Thereafter, the polymer was separated by centrifuging, dried by heating in a vacuum, and thus obtained as a product copolymer.

The results of evaluation of this copolymer are set forth in Table 1.

EXAMPLE A2

A copolymer of propylene with hexene-1 was produced under the conditions specified in Example A1 except for a rate of supplying of the hexene-1 of 5.1 kg/hour and a hydrogen concentration of the gaseous phase part of 2.9 percent by volume.

The results are shown in Table 1.

EXAMPLE A3

Homopolymerization of propylene was carried out during 15 minutes at 40° C. and 2 kg/cm$^2$, gauge, with addition of quantities of titanium trichloride and DEAC of 6.5 g and 33 g, respectively.

The temperature of the reaction system was then raised to 60° C., and propylene and hexene-1 were fed at rates of 6.5 kg/hr and 3.9 kg/hr, respectively, during 4.0 hours. At the end of this period, the supplying of the hexene-1 was stopped, and only the propylene was supplied at the rate of 6.5 kg/hr for a further 1.5 hours.

During the above described procedure, hydrogen was also supplied into the reaction system so as to obtain a hydrogen concentration of the gaseous phase part of the reaction vessel interior of 4.2 percent by volume.

The polymer slurry thus obtained was processed similarly as in Example A1 thereby to produce a product copolymer.

The results are shown in Table 1.

EXAMPLE A4

A copolymer of propylene and octene-1 was produced under the conditions set forth in Example A1 except for the use of octene-1 in place of hexene-1 and a feed rate of this octene-1 of 12 kg/hr.

The results are shown in Table 1.

COMPARISON EXAMPLE A1

A copolymer of propylene and hexene-1 was produced under the conditions specified in Example A3 except that the hexene-1 was fed at a rate of 1.6 kg/hr.

The results are shown in Table 1.

COMPARISON EXAMPLE A2

A copolymer of propylene and hexene-1 was produced as in Example A1 except for rates of feeding of the propylene and hexene-1 after the homopolymerization of propylene of 1.7 kg/hr and 12 kg/hr, respectively.

The results are shown in Table 1.

TABLE 1

|  | Example A1 | Example A2 | Example A3 | Example A4 | Comparison Example A1 | Comparison Example A2 |
|---|---|---|---|---|---|---|
| Whole polymer |  |  |  |  |  |  |
| Limiting viscosity (135° C., in decalin) (dl/g) | 2.8 | 2.4 | 1.9 | 2.6 | 2.5 | 1.7 |
| M$_2$ content | hexene-1 | hexene-1 | hexene-1 | hexene-1 | hexene-1 | hexene-1 |
| (% by wt.) | 14.6 | 11.5 | 8.8 | 10.3 | 2.2 | 32.1 |
| ODCB successive extraction |  |  |  |  |  |  |
| Fraction A |  |  |  |  |  |  |

TABLE 1-continued

|  | Example A1 | Example A2 | Example A3 | Example A4 | Comparison Example A1 | Comparison Example A2 |
|---|---|---|---|---|---|---|
| Quantity (% by wt.) | 29.2 | 19.9 | 13.3 | 20.3 | 6.9 | 76.8 |
| DSC fusion peak temp. (°C.) | not recognizable | not recognizable | not recognizable | not recognizable | not recognizable | not recognizable |
| $M_2$ content (% by wt.) | 29.9 | 22.4 | 20.5 | 19.5 | 4.0 | 37.3 |
| Fraction B |  |  |  |  |  |  |
| Quantity (% by wt.) | 31.6 | 34.0 | 29.0 | 32.9 | 13.0 | 23.2 |
| DSC fusion peak temp.(°C.) | 116 | 115 | 118 | 117 | 127 | 113 |
| $M_2$ content (% by wt.) | 12.1 | 13.3 | 12.8 | 11.8 | 3.1 | 14.9 |
| Fraction C |  |  |  |  |  |  |
| Quantity (% by wt.) | 39.2 | 46.1 | 57.7 | 47.2 | 80.1 | 0 |
| DSC fusion peak temp. (°C.) | 145 | 148 | 150 | 148 | 157 | — |
| $M_2$ content (% by wt.) | 5.2 | 5.5 | 4.1 | 5.2 | 1.9 | — |
| Olsen bending stiffness (10° angle) (kg/cm$^2$) | 1900 | 2960 | 4250 | 3020 | 9340 | 480 |
| Haze (%) | 12.3 | 17.1 | 33.8 | 18.3 | 56.7 | 9.8 |
| Deformation under heat and pressure (%) | 21.0 | 10.2 | 5.4 | 9.8 | 1.2 | 88 |

EXAMPLE B1

A 10-liter stainless-steel autoclave provided with an agitator was amply purged with propylene and thereafter supplied with 3.5 lit. of heptane, 1.5 g of DEAC, and 0.3 g of titanium trichloride (TAU catalyst manufactured by Marubeni Solvay Kagaku Sha, Japan). The interior temperature of the autoclave was set at 50° C., and propylene and hydrogen were fed at rates of 300 g/hr and 500 cc (STP)/hr, respectively, into the autoclave during 45 minutes.

Thereafter, the temperature was raised to 60° C., and propylene, hexene-1, and hydrogen were fed into the autoclave at rates of 300 g/hr, 550 g/hr, and 450 cc (STP)/hr, respectively, during 3 hours. Upon completion of the copolymerization reaction, the catalyst was decomposed with butanol, and separation by filtration was carried out, whereupon a block copolymer in powder form was obtained. This block copolymer was dried under reduced pressure.

The physical properties of this block copolymer are set forth in Table 2.

The proportion of the propylene homopolymer block in the block copolymer and the hexene-1 content in the random copolymer block cannot be calculated directly. Accordingly, these quantities were determined indirectly by assuming that a propylene homopolymer of the same quantity as that obtained by experimentally producing only the propylene homopolymer block, apart from the experimental production of the above mentioned block copolymer, is formed also in the block copolymer.

EXAMPLES B2 and B3

Block copolymers were produced under the conditions specified in Example B1 except for time periods of 20 minutes and 10 minutes, respectively, during which homopolymerization of propylene was carried out instead of 45 minutes.

The physical properties of the block copolymers thus obtained are shown in Table 2.

COMPARISON EXAMPLE B1

A random copolymer was produced under the conditions set forth in Example B1 except that homopolymerization of propylene was not carried out.

The physical properties of the random copolymer thus obtained are shown in Table 2.

COMPARISON EXAMPLE B2

A block copolymer was produced under the conditions of Example B1 except for a time period of 60 minutes during which homopolymerization of propylene was carried out and except for feed rates and a copolymerization time period of propylene and hexene-1 of 340 g/hr, 800 kg/hr, and 60 minutes, respectively, in the random copolymerization of propylene and hexene-1.

The physical properties of the copolymer thus obtained are shown in Table 2.

EXAMPLES B4 AND B5

Block copolymers were produced under the conditions of Example B1 except for propylene homopolymerization time periods of 40 minutes and 15 minutes, respectively, and a hexene-1 feed rate of 325 g/hr in the random copolymerization block of propylene and hexene-1.

The physical properties of the block copolymers thus obtained are shown in Table 2.

COMPARISON EXAMPLE B3

A random copolymer was produced under the conditions of Example B4 except that homopolymerization of propylene was not carried out.

The physical properties of the copolymer thus obtained are shown in Table 2.

COMPARISON EXAMPLE B4

A block copolymer was produced under the conditions of Example B1 except for a propylene homopolymerization time period of 1 hour and except for feed rates of the propylene and hexene-1 of 230 g/hr and 350 g/hr, respectively, and a copolymerization time period of 60 minutes in the random copolymerization block of propylene and hexene-1.

The physical properties of the copolymer thus obtained are shown in Table 2.

TABLE 2

| Example Comparison Example | B1 | B2 | B3 | B1 | B2 | B4 | B5 | B3 | B4 |
|---|---|---|---|---|---|---|---|---|---|
| Proportion of propylene homopolymer in block copolymer (%) | 21.2 | 10.6 | 5.6 | 0 | 58.4 | 20.3 | 9.4 | 0 | 60.5 |
| Hexene-1 content in random copolymer block (%) | 17.6 | 18.3 | 18.6 | 18.2 | 18.4 | 11.9 | 12.4 | 12.8 | 12.1 |
| MFR (g/10 min, 230° C.) | 4.2 | 4.5 | 3.3 | 4.8 | 3.9 | 4.5 | 4.2 | 4.8 | 3.6 |
| Fusion peak temp. (°C.) | 155 | 151 | 150 | 147 146 | 161 | 157 | 153 | 149 | 162 |
| Proportion of fusion heat of portion fusing above 130° C. (%) | 79.1 | 70.8 | 69.0 | 60.5 | 89.1 | 79.9 | 70.9 | 66.5 | 82.0 |
| Olsen bending stiffness (10° angle) (kg/cm$^2$) | 1,860 | 1,670 | 1,550 | 1,500 | 6,970 | 3,580 | 3,440 | 3,400 | 7,580 |
| Deformation under heat and pressure (130° C., 1 kg/cm$^2$, 60 min.) (%) | 10.8 | 13.2 | 19.6 | 30.0 | 8.1 | 10.5 | 15.1 | 25.2 | 6.1 |
| Haze (1-mm pressed sheet) (%) | 15.6 | 13.2 | 12.3 | 11.2 | 41.4 | 28.9 | 24.8 | 20.8 | 43.8 |

What is claimed is:

1. A copolymer of propylene and a straight-chain α-olefin having 6 carbon atoms, characterized in that:
    (1) the limiting viscosity thereof is 0.3 to 15 dl/gram (at 135° C., in decalin);
    (2) the content of the straight-chain α-olefin having 6 carbon atoms therein is 5 to 20 percent by weight; and
    (3) the quantity, the fusion peak temperature as determined by differential scanning calorimetry (DSC), and the content of the straight-chain α-olefin of each of the fractions resulting from successive extraction of the copolymer at 40° C. and 80° C. by means of o-dichlorobenzene are as indicated in the table:

| Fraction | Definitive quantities: | | |
|---|---|---|---|
| | Quantity (% by weight) | Fusion peak temp. by DSC (°C.) | Content of straight-chain α-olefin (% by weight) |
| Fraction soluble at or below 40° C. | 1 to 45 | Substantially no peaks recognizable | 10 to 60 |
| Fraction soluble at or above 40° C. and at or below 80° C. | 10 to 74 | 80 to 135 | 3 to 17 |
| Fraction insoluble at or below 80° C. | 25 to 75 | 135 to 160 | 1 to 11 |

2. The copolymer as claimed in claim 1 in which the copolymer consists of propylene ($M_1$), the straight-chain α-olefin ($M_2$) and 0 to 30% by weight of the total quantity of the $M_1$ and $M_2$ of a monomer copolymerized therewith.

3. A block copolymer of propylene and a straight-chain α-olefin having 5 to 12 carbon atoms, characterized in that:
    (1) the block copolymer consists essentially of (a) about 0.05 to 50 percent of a propylene homopolymer block and (b) about 99.5 to 50 percent of a random copolymer block of propylene and a straight-chain α-olefin having 5 to 12 carbon atoms.
    (2) the intrinsic viscosity of the block copolymer is 0.3 to 15 dl/g (in decalin, at 135° C.).

4. The block copolymer as claimed in claim 3 in which the copolymer is characterized further in that:
    (3) one or more fusion peaks of the block copolymer based on analysis by means of a differential scanning calorimeter (DSC) all exist at or above 130° C., or the fusion heat quantity of the portion fusing at or above 130° C. is 40 percent or more than the total fusion heat quantity.
    (4) the Olsen bending stiffness of 10-degree angle (as measured in conformance with ASTM D-747-70, Test for Stiffness of Plastics by Means of a Cantilever Beam) is 6,000 kg/cm$^2$ or lower.

5. The block copolymer as claimed in claim 3 or in which the straight-chain α-olefin is selected from the group consisting of pentene-1, hexene-1 and octene-1.

6. The block copolymer as claimed in claim 3, 4 or 5 in which the copolymer consists of propylene ($M_1$), the straight-chain α-olefin ($M_2$) and a monomer copolymerizable therewith ($M_3$) in a quantity of 0 to 10% by weight of the total quantity of $M_1$, $M_2$ and $M_3$.

7. A copolymer according to claim 1 in which the content of said straight-chain α-olefin having 6 carbon atoms is 7 to 15%.

8. A copolymer according to claim 1 or 7 in which, the quantity in % by weight of:
    the fraction soluble at 40° C. or below is 5 to 35,
    the fraction soluble at or above 40° C. and at or below 80° C. is 20 to 60 and the fraction insoluble at or below 80° C. is 40 to 55.

9. A copolymer according to claim 7 in which the fraction soluble at or above 40° C. and at or below 80° C. has a fusion peak temperature of 90° C. to 125° C. and a content of straight-chain α-olefin in % by weight of 7 to 13 and the fraction insoluble at or below 80° C. has a fusion peak temperature of 140° to 155° C. and a content of straight-chain α-olefin in % by weight of 2 to 7.

10. The block copolymer according to claim 3 which consists essentially of about 1 to 30% by weight of a propylene homopolymer block and about 99 to 70% by weight of a random copolymer block of propylene and a straight-chain α-olefin having 5 to 12 carbon atoms.

* * * * *